(12) United States Patent  
Lee et al.

(10) Patent No.: US 8,798,277 B1
(45) Date of Patent: *Aug. 5, 2014

(54) MUTE INDICATOR

(71) Applicant: Sprint Communications Company L.P., Overland Park, KS (US)

(72) Inventors: Woojae Lee, Manhattan, KS (US); Trevor Daniel Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,928

(22) Filed: May 20, 2013

Related U.S. Application Data

(63) Continuation of application No. 12/687,529, filed on Jan. 14, 2010, now Pat. No. 8,467,524.

(51) Int. Cl.
*H04R 29/00* (2006.01)

(52) U.S. Cl.
USPC .............................. 381/56; 381/57; 379/421

(58) Field of Classification Search
USPC ................... 381/56–57, 104–105; 379/421
See application file for complete search history.

(56) References Cited

U.S. PATENT DOCUMENTS

2010/0080382 A1* 4/2010 Dresher et al. ............... 379/421

* cited by examiner

*Primary Examiner* — Disler Paul

(57) ABSTRACT

Embodiments of the present invention provide systems, methods, and computer-readable media for presenting a mute indicator to a caller when the caller is attempting to provide input to a call that has been muted. In particular, a determination is made that a mute function is engaged during a call. An area surrounding a calling system, such as a phone, is then monitored by a monitoring system to determine whether a caller is attempting to provide input to the call. A determination is then made that a caller is attempting to provide input to the call. The determination may be based on a caller providing a threshold volume of voice input within a threshold area of proximity near the calling system. A mute indicator is then presented to the caller to notify the caller that the call has a mute function engaged.

20 Claims, 15 Drawing Sheets

MUTE INDICATOR

CROSS-REFERENCE TO RELATED APPLICATIONS

This application is a continuation of U.S. patent application Ser. No. 12/687,529, filed on Jan. 14, 2010 and titled "MUTE INDICATOR," the disclosure of which is incorporated by reference herein in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features of the claimed subject matter, nor is it intended to be used as an aid in isolation to determine the scope of the claimed subject matter.

Auditory communications systems, such as phones, allow users to participate in phone calls to other users. While a user making a call is generally provided with an option of placing a phone in a mute status, the user may forget that a phone is in a mute status. As such, the user may attempt to participate in a phone call while the phone is in the mute status. When a user attempts to participate in a phone call while the phone is in the mute status, a notification may be presented to the user to remind the user of the mute status.

In a first aspect, a set of computer-readable media having computer-executable instructions embodied thereon are provided that, when executed, cause an auditory communications device to perform a method of indicating that a speaker's voice will not be communicated. The method includes determining that the auditory communications device is in a mute status, which prevents a user of the auditory communications device from being heard when attempting to speak through the auditory communications device. Further, the method includes presenting a first indication of the mute status in response to the determining that the auditory communications device is in the mute status. The method also includes determining that a user is within a threshold proximity of a designated component of the auditory communications device. Additionally, the method includes presenting a supplemental indication of the mute status in response to the determining that the user is within the threshold proximity of the designated component.

In a second aspect, computer-readable media having computer-executable instructions embodied thereon are provided that, when executed, cause a calling system to perform a method of indicating that a speaker's voice will not be communicated. The method includes determining that the calling system is in a mute status, which prevents a user of the auditory communications device from being heard when attempting to speak through the auditory communications device. Further, the method includes presenting a first indication of the mute status in response to the determination that the calling system is in the mute status, wherein the first mute status is characterized by a first set of characteristics. Additionally, the method includes determining that a first user is in a first physical position related to a first designated component of a first communications device that is coupled to the calling system. The method also includes continuing to present the first indication until the user moves to a second physical position that varies by a threshold amount with respect to the first physical position, and then doing one or more of the following: presenting a second indication of the mute status, wherein the second indication includes a second set of characteristics; or varying at least one characteristic of the first set of characteristics.

In a third aspect, computer-readable media having computer-executable instructions embodied thereon are provided that, when executed, cause an auditory communications device to perform a method of indicating that a speaker's voice will not be communicated. The method includes determining that the auditory communications device is in a mute status, which prevents a user of the auditory communications device from being heard when attempting to speak through the auditory communications device. The method includes presenting a first indication of the mute status in response to the determining that the auditory communications device is in the mute status. The method also includes determining that a user is touching a designated component of the auditory communications device. Further, the method includes presenting a supplemental indication of the mute status in response to the determining that the user is touching the designated component.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
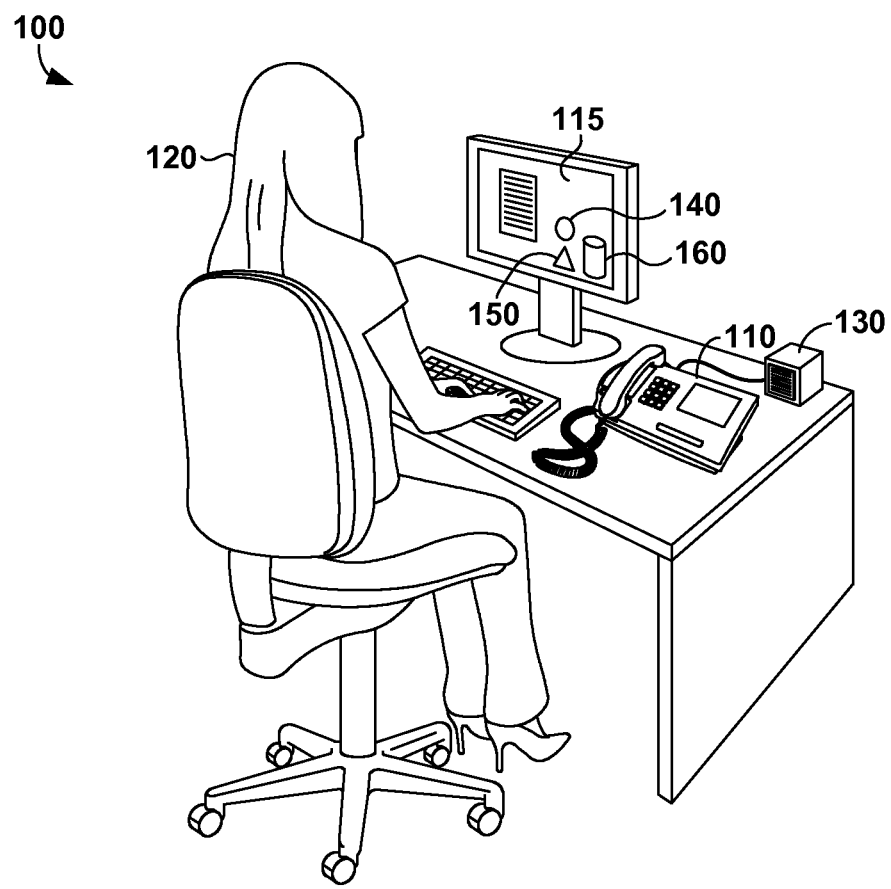
FIG. 1 depicts an illustrative mute status indication system in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| MP3 | MPEG-1 Audio Layer 3 |
| PC | Personal Computer |
| PDA | Personal Digital Assistant |
| RAM | Random Access Memory |
| ROM | Read Only Memory |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for presenting an indication of a mute status of a phone in response to a determination that a user is attempting to participate in a phone call. In particular, a determination is made that an auditory communication device, such as a phone, is in a mute status. An area surrounding the auditory communications device is then monitored by a proximity sensor to determine whether a caller is within a threshold proximity to the auditory communications device. A determination is then made that a caller is attempting to provide input to the call. In some embodiments, a determination that a user is attempting to provide input to a call may also be based on a caller providing a threshold volume of voice input within a threshold area of proximity near the auditory communication device. A mute indicator is then presented to the caller to notify the caller that the auditory communications device the user is using is in a mute status.

While many auditory communications systems, such as phones, include mute functions, a user of a phone may forget that a phone is in a mute status. Even when an indication of a mute status is presented on a phone, the indication is independent of whether or not the user is attempting to speak on the phone. As such, it is easy to overlook an indication when there is no distinction made in the indication between when the user is intentionally keeping the phone in a mute status and when the user is attempting to speak into the phone to participate in a conversation. In contrast, embodiments of the present invention provide a distinction of an indication(s) of mute status of an auditory communications device between when a user is attempting to provide input to a call and when a user is not attempting to provide input to a call.

For example, when the phone of a user is in a mute status and the user attempts to speak into a component of the phone, such as a microphone, a secondary and/or supplemental indication of the phone's mute status may be presented to the user. In some embodiments, a characteristic of an indication of a mute status of an auditory communications device may comprise at least one of a display notification, a video notification, an audio notification, a notification associated with a first display device, and a notification associated with a second display device.

Turning now to FIG. 1, an illustrative mute status indication system is provided in accordance with an embodiment of the present invention and referenced by the numeral 100. System 100 includes an auditory communications device 110. For brevity or as a shorthand form, this description might refer to a "device" instead of an "auditory communications device." This shorthand does not mean to imply a distinction with the different terms. In addition, an auditory communications device may refer to a number of different devices such as a cell phone, a computer, a walky-talky, or a PDA. This description does not intend to convey bright-line distinctions between the different types of auditory communication devices.

In addition to device 110, system 100 may further include user interface 115, user 120, indication 130, application 140, memory 150, and data structure 160. Generally, user interface 115 and indication 130 provide an input/output (I/O) interface that user 120 may engage to interact with device 110. For example, user interface 115 may include a touch screen that a user may scratch or touch to interact with device 110. This interaction may include providing settings to govern the conditions for an indication of mute status presented on user interface 115 in accordance with embodiments of the present invention.

Auditory communications device 110 can be any device with audio capacity. In some embodiments, audio communications device 110 may be capable of web accessibility, such as to facilitate auditory web calls, conferences, and/or meetings. Device 110 might take on a variety of forms, such as a personal computer (PC), a laptop computer, a mobile phone, a personal digital assistance (PDA), a video player, a handheld communications device, a workstation, any combination of these devices, or any other mobile device, including a device that is capable of web accessibility. In some embodiments, device 110 is a mobile device that utilizes a wireless telecommunications network to facilitate communication. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

Device 110 may also include application 140, memory 150, and data structure 160. Application 140 may carry out various functional aspects and might take on a variety of forms. For example, application 140 might include configuration settings, might facilitate communicating data between multiple devices, might handle updates, include user settings, etc. Specifically, application 140 may be used to implement a method for indicating a mute status of device 110 in response to a determination that a user 120 is attempting to provide input to a call using device 110. For example, application 140 may use computer software to determine user 120 is within a threshold proximity to device 110. Further, application 140 may present an indication 130 of mute status to user 120 in response to determining user 120 is within a threshold proximity of device 110.

Memory 150 may include a data structure 160 that stores and facilitates the operation of application 140. For example, memory 150 may store data relating to interactions between user 120 and user interface 115, as well as information related to the proximal relation of user 120 with respect to device 110. In addition, memory 150 may store firmware and other various software modules and components that might be present in auditory communications device 110. These modules and components may be used in some embodiments of the present invention to indicate a mute status of device 110 in response to user 120 attempting to provide input to a call associated with device 110. Other examples of illustrative software include things such as the operating system of a phone, third-party applications, ring tones, location-based services, contact information, and the like. In sum, FIG. 1 is not meant to indicate all, or even major, systems or components of auditory communications device 110. An overview of auditory communications device 110 is presented and certain components are listed so as to be able to refer to them throughout this disclosure.

As discussed above, there are a number of methods that may be used to determine that a caller is attempting to provide input to a phone conversation. One way of determining a user is attempting to participate in the phone conversation is based on the proximity of a user to the phone. For example, in some embodiments, it may be determined that a user is attempting to use the phone when the user is within a threshold proximity of a designated component of the phone, such as a microphone.

Figure 2:
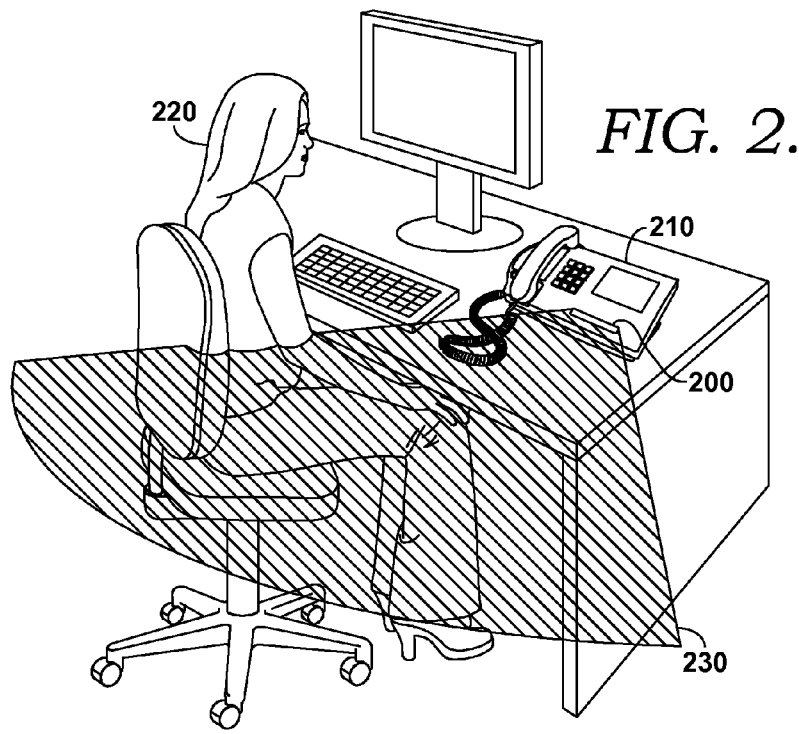
FIG. 2 depicts an illustrative proximity sensor associated with an auditory communications device in accordance with an embodiment of the present invention.

FIG. 2 depicts an illustrative proximity sensor 200 associated with an auditory communications device, such as phone 210, in accordance with an embodiment of the present invention. As discussed above, an auditory communications device may comprise one of a number of devices that may be used to participate in a call. Proximity sensor 200 may be used to determine whether a user 220 is within a threshold proximity 230 to phone 210. If a user 220 is within a threshold proximity 230 to phone 210, it may be determined that the user is attempting to provide input to a phone conversation. As illustrated above in FIG. 2, a determination that a user is attempting to provide input to a phone call may be based on the proximity of the user to an auditory communications device, such as a phone. In alternative embodiments, a determination that a user is attempting to provide input to a phone call may be based on how close a user is to a designated component of the phone, such as a microphone. In alternative embodiments, proximity sensor 210 may determine the location of user.

Figure 3:
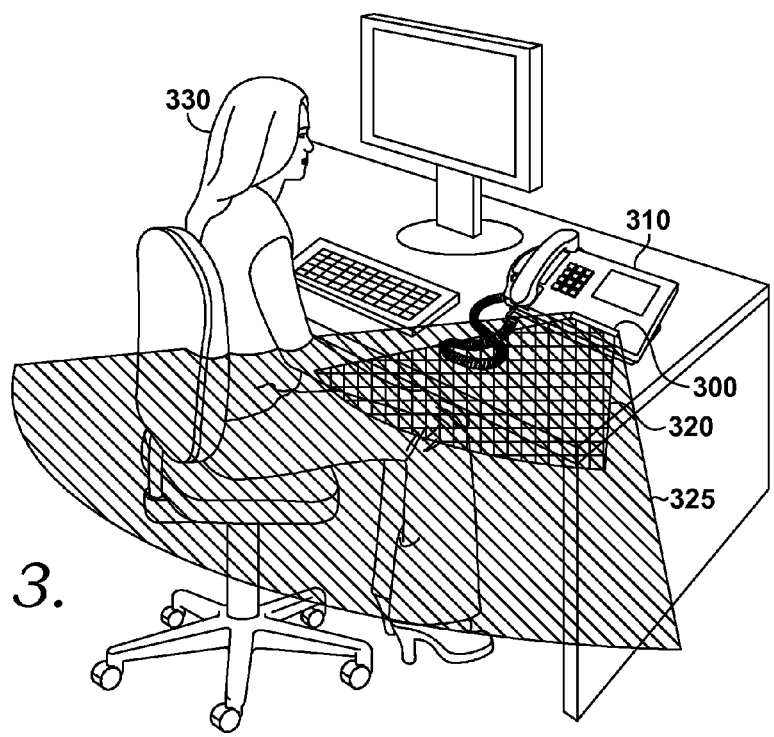
FIG. 3 depicts an illustrative proximity sensor including threshold levels of proximity, the proximity sensor associated with an auditory communications device in accordance with an embodiment of the present invention.

In some embodiments, a user's attempt to provide input to a phone call may be assessed based on a plurality of threshold proximities. For example, FIG. 3 depicts an illustrative proximity sensor 300 including two threshold levels of proximity, the proximity sensor 300 associated with an auditory communications device, such as phone 310, in accordance with an embodiment of the present invention. Similar to FIG. 2, FIG. 3 includes a phone 310, a first threshold proximity 320, a second threshold proximity 325, and a user 330. As discussed above, as user 330 comes within a second threshold proximity 325 to phone 310, an indication of a mute status of phone 310 may be presented to the user. Accordingly, as a user comes into closer proximity, such as first threshold proximity 320, to phone 310, user 330 may be presented with a supplemental, increasingly intrusive indication of a mute status of phone 310. In embodiments, a supplemental indication of a mute status may be increasingly intrusive by amplifying the notification, providing auxiliary notifications, etc.

Figure 4:
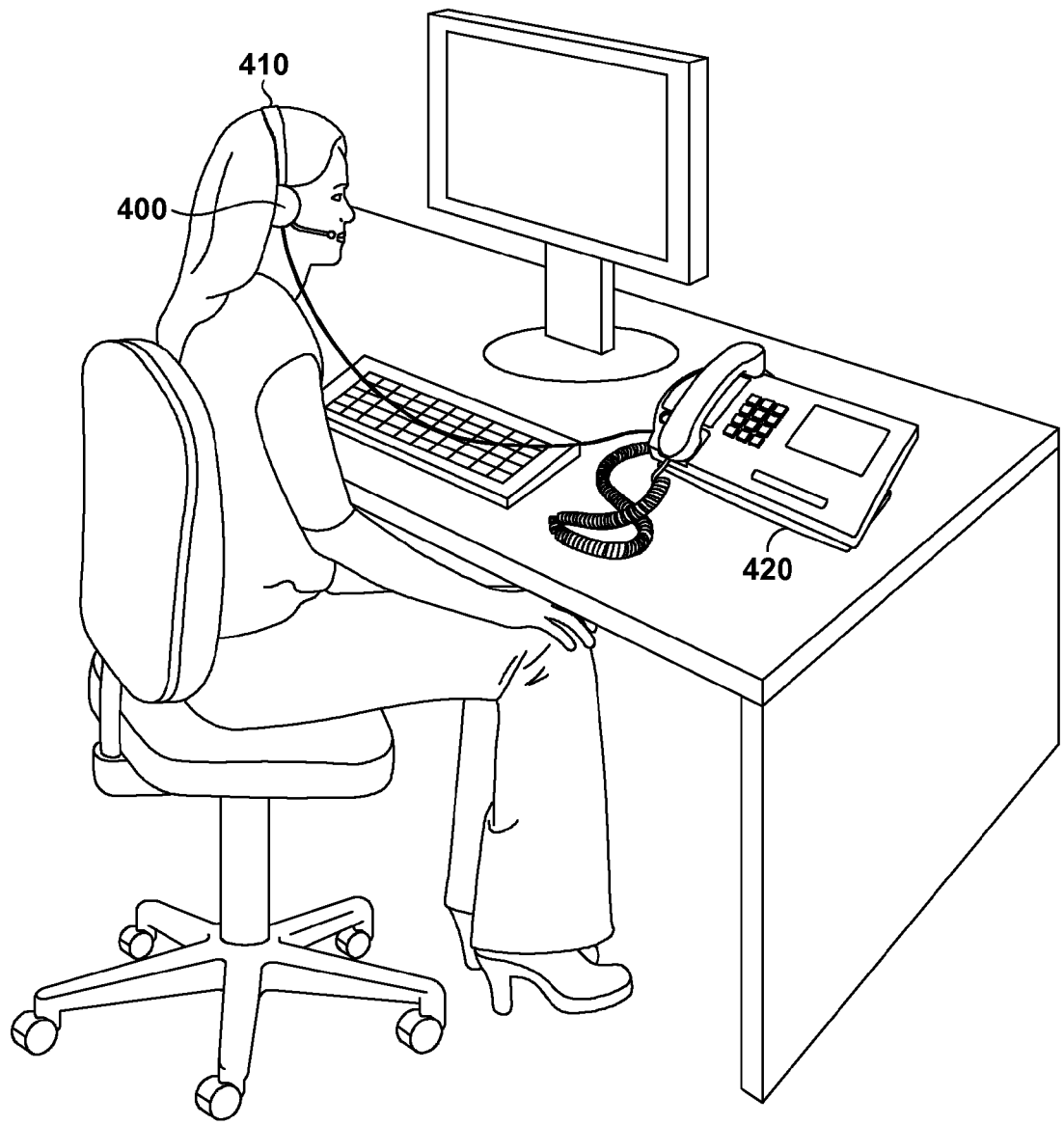
FIG. 4 depicts an illustrative active resistive touch screen device associated with an auditory communications device in accordance with an embodiment of the present invention.

As discussed above in FIG. 2, a determination that a user is attempting to provide input to a phone call may be based on the proximity of the user to an auditory communications device, such as a phone. In alternative embodiments, a determination that a user is attempting to provide input to a phone call may be based on contact of a user with a designated component of the phone, such as a headset. For example, FIG. 4 depicts an illustrative active resistive touch screen device 400 associated with an auditory communications device in accordance with an embodiment of the present invention. As seen in FIG. 4, resistive touch screen device 400 is placed at headset 410 of phone 420. In some embodiments, a sensor of resistive touch screen device 400 may be in complete contact with a head of a user to be "active." Resistive touch screen device 400 may be "active" when a user is wearing headset 410 so as to determine the user is attempting to provide input into a phone conversation. As seen in FIG. 4, resistive touch screen device 400 is "active," as the headset is being worn by the user. In response to resistive touch screen device 400 being "active," a mute status of phone 420 may be indicated.

Figure 5:
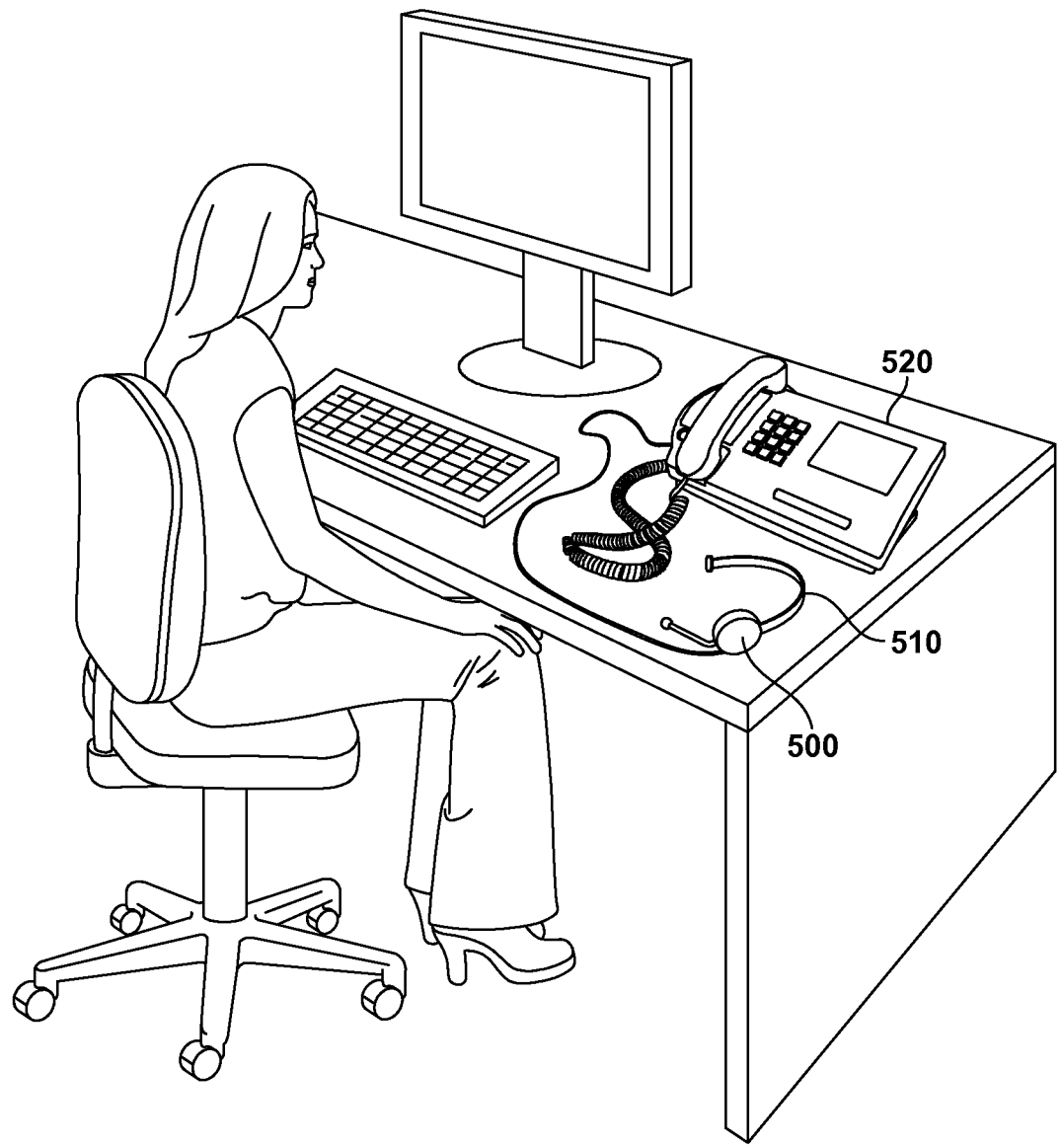
FIG. 5 depicts an illustrative inactive resistive touch screen device associated with an auditory communications device in accordance with an embodiment of the present invention.

In contrast to FIG. 4, FIG. 5 depicts an illustrative inactive resistive touch screen device 500 associated with an auditory communications device in accordance with an embodiment of the present invention. Similar to FIG. 4, FIG. 5 includes resistive touch screen device 500 placed at headset 510 of phone 520. Whereas resistive touch screen device 400 is in full contact with the head of a user, resistive touch screen device 500 is not being worn by the user. Accordingly, resistive touch screen device 500 is "inactive." When resistive touch screen device 500 is inactive, an indication of mute status that is based on a user attempting to speak into phone 510 may not be presented until resistive touch screen device 500 becomes active.

Figure 6:
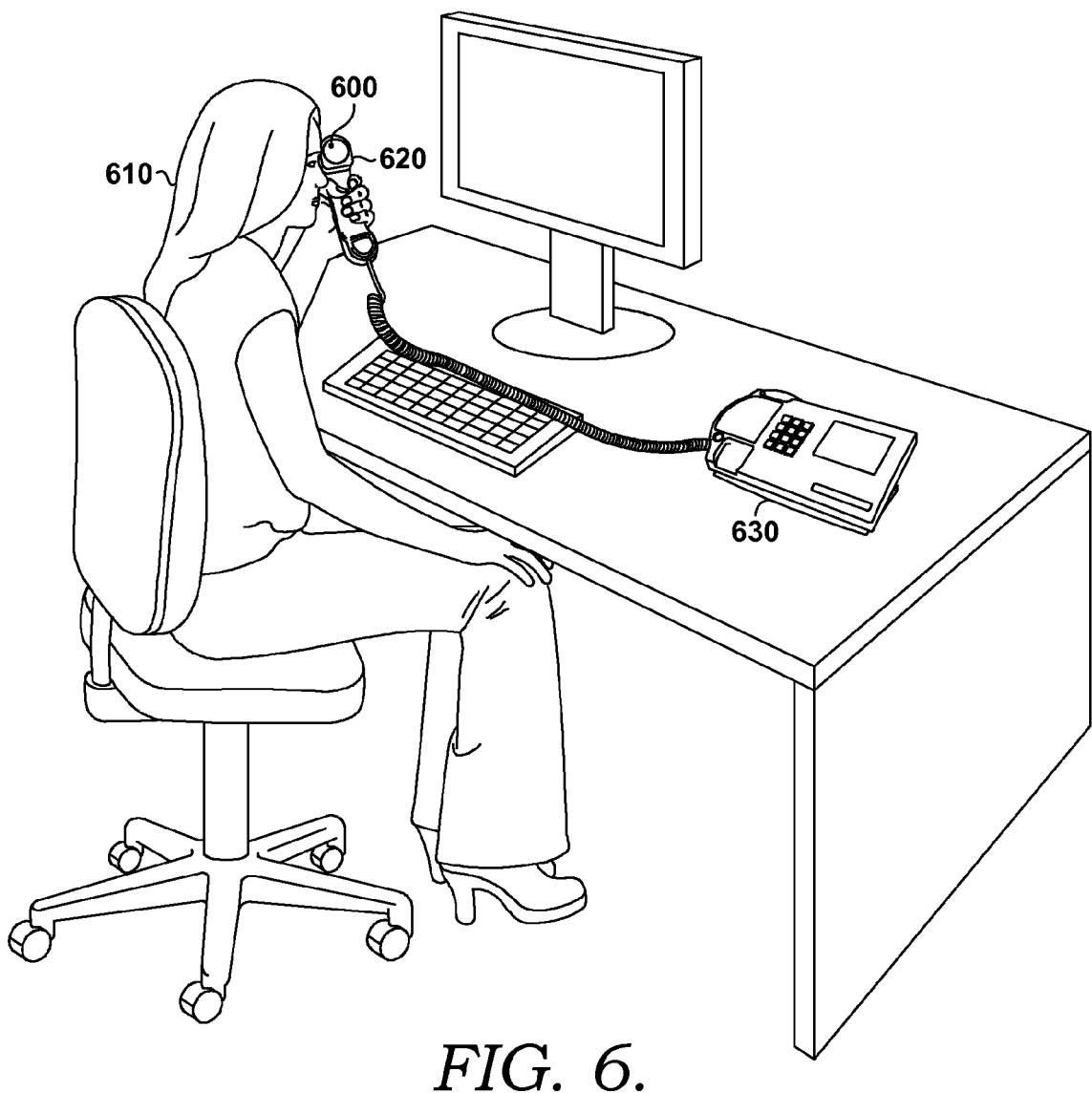
FIG. 6 depicts an illustrative active capacitive touch screen device associated with an auditory communications device in accordance with an embodiment of the present invention.

In some embodiments, a user's attempt to provide input to a phone call may be assessed based on the skin of the user being in physical contact with a designated component of an auditory communications device. In contrast to a resistive touch screen device as discussed in FIGS. 4 and 5, which responds to pressure, a capacitive touch screen device as discussed in FIGS. 6 and 7 responds to reacting with the skin of a user. FIG. 6 depicts an illustrative active capacitive touch screen device 600 associated with an auditory communications device, such as phone 630, in accordance with an embodiment of the present invention. In some embodiments, a capacitive touch screen device 600 may be active when the skin of a user 610 is in physical contact with a designated component of phone 630. For example, a designated component may comprise a handset 620 of phone 630. In some embodiments, when the ear of user 610 is in contact with capacitive touch screen device 600, capacitive touch screen device is "active." In response to capacitive touch screen device 600 being "active," a mute status of phone 630 may be indicated.

Figure 7:
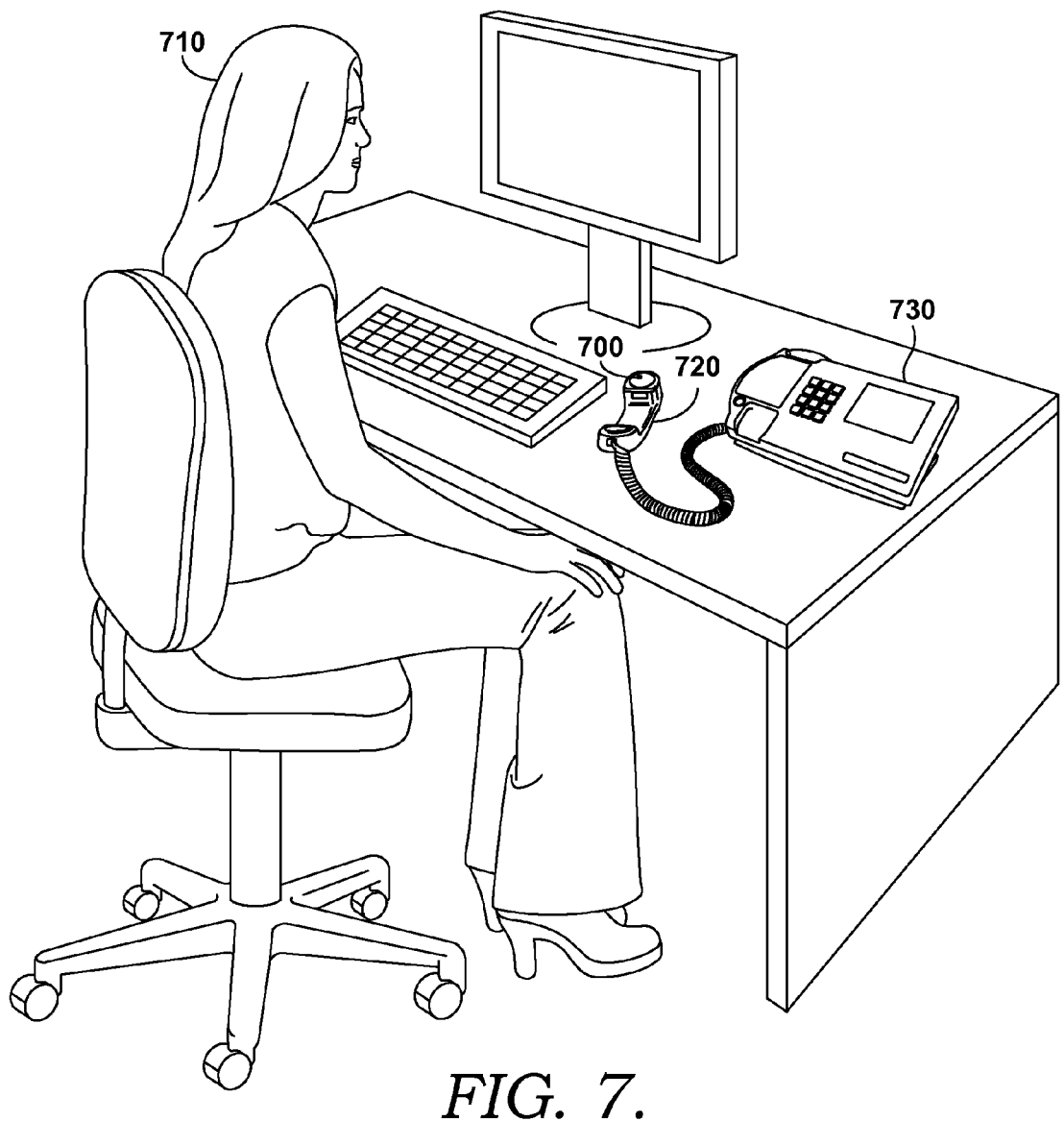
FIG. 7 depicts an illustrative inactive capacitive touch screen device associated with an auditory communications device in accordance with an embodiment of the present invention.

In contrast to FIG. 6, FIG. 7 depicts an illustrative inactive capacitive touch screen device 700 associated with an auditory communications device in accordance with an embodiment of the present invention. Capacitive touch screen device 700 is inactive when the skin of user 710 is not in physical contact with capacitive touch screen device 700, such as capacitive touch screen device 700 of headset 720 of phone 730. When capacitive touch screen device 700 is inactive, an indication of mute status that is based on a user 710 attempting to speak into the auditory communications device may not be presented until capacitive touch screen device 700 becomes active.

Figure 8:
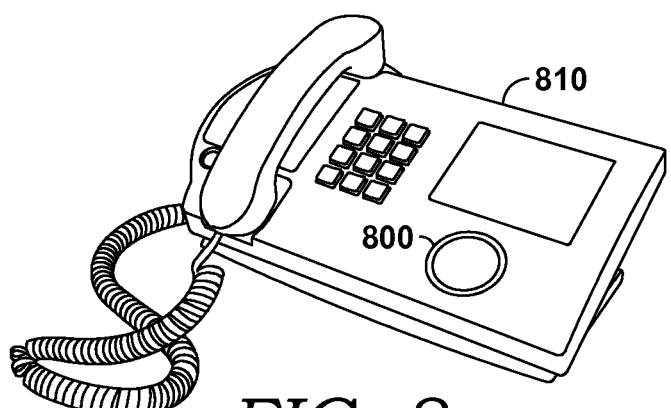
FIG. 8 depicts an illustrative camera associated with an auditory communications device in accordance with an embodiment of the present invention.

In alternative embodiments, a determination may be made that a user is attempting to provide input to a call facilitated by an auditory communications device based on movements of the user. FIG. 8 depicts an illustrative camera 800 associated with an auditory communications device, such as phone 810, in accordance with an embodiment of the present invention. For example, camera 800 may determine a user is moving towards phone 810. In response to camera 800 determining a user is moving towards phone 810, a mute status of phone 810 may be indicated.

While embodiments of the present invention discuss the use of a camera as a device to locate and/or monitor the movements of a user, other devices may also be used to determine conditions discussed above. For example, a motion sensor may be used in conjunction with a proximity sensor to determine when a user is moving within a threshold proximity of an auditory communications device. Additionally, a motion sensor and/or a proximity sensor may be used to determine a user is moving towards or away from an auditory communications device.

Figure 9:
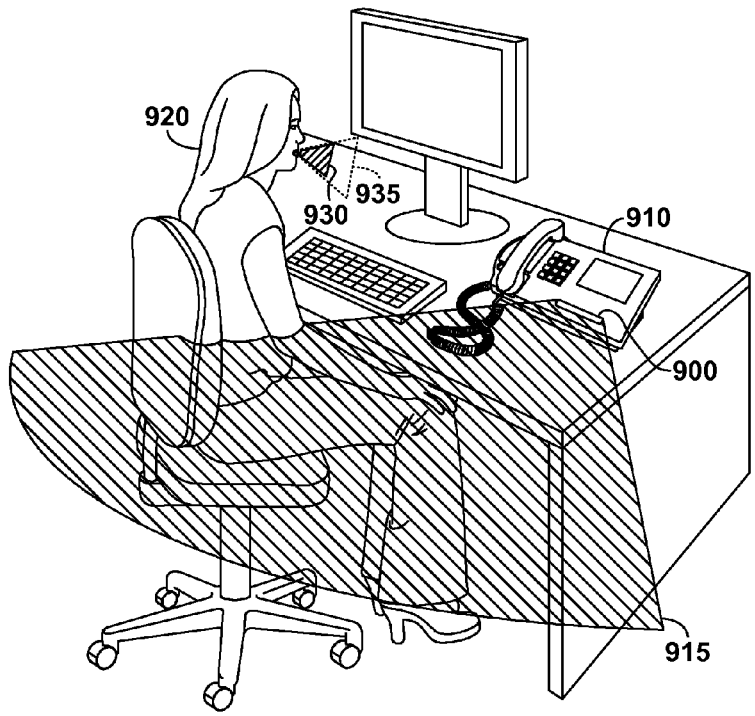
FIG. 9 depicts a user whispering into an auditory communications device including a proximity sensor in accordance with an embodiment of the present invention.

In addition to determining a user is attempting to provide input to a phone call through an auditory communications device based on a proximity threshold, a determination may also be based on a user meeting a minimum threshold proximity simultaneously with the user meeting a minimum threshold volume. FIG. 9 depicts a user 920 whispering 930 into an auditory communications device, such as phone 910, including a proximity sensor 900 in accordance with an embodiment of the present invention. As seen in FIG. 9, user 920 is within threshold proximity 915. However, user 920 has not met a threshold volume 935, since user 920 whispering 930 is below threshold volume 935. Accordingly, in some embodiments where user 920 is required to meet minimum threshold proximity 915 in addition to threshold volume 935, a supplemental indication of a mute status of phone 900 may not be presented.

Figure 10:
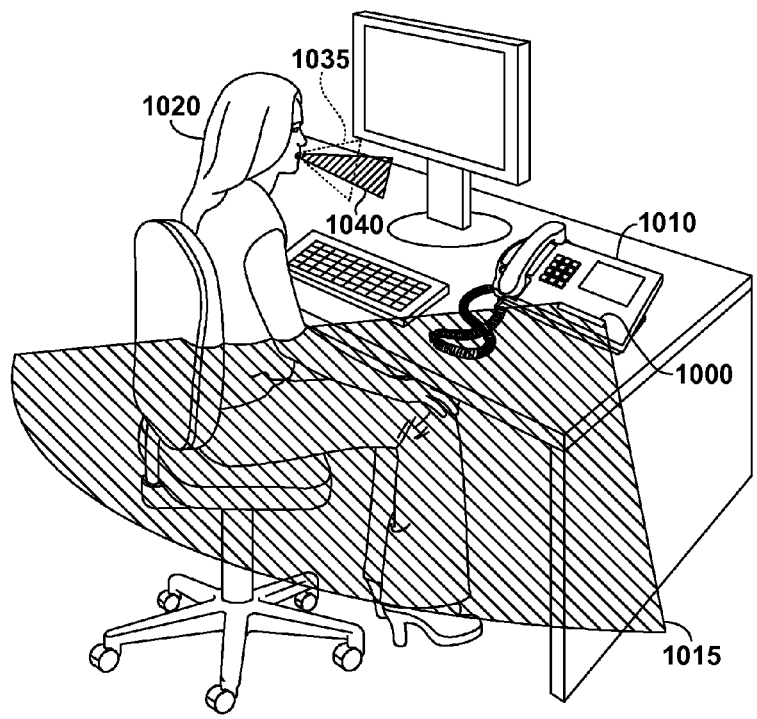
FIG. 10 depicts a user speaking into an auditory communications device including a proximity sensor in accordance with an embodiment of the present invention.

In further embodiments, FIG. 10 depicts a user 1020 speaking 1040 into an auditory communications device, such as phone 1010, including a proximity sensor 1000 in accordance with an embodiment of the present invention. As seen in FIG. 10, user 1020 is within threshold proximity 1015. Additionally, user 1020 has met a threshold volume 1035 since user 1020 speaking 1030 is above threshold volume 1035. Accordingly, in some embodiments where user 1020 is required to meet minimum threshold proximity 1015 in addition to threshold volume 1035, an indication of a mute status of phone 1010 would be presented.

Figure 11:
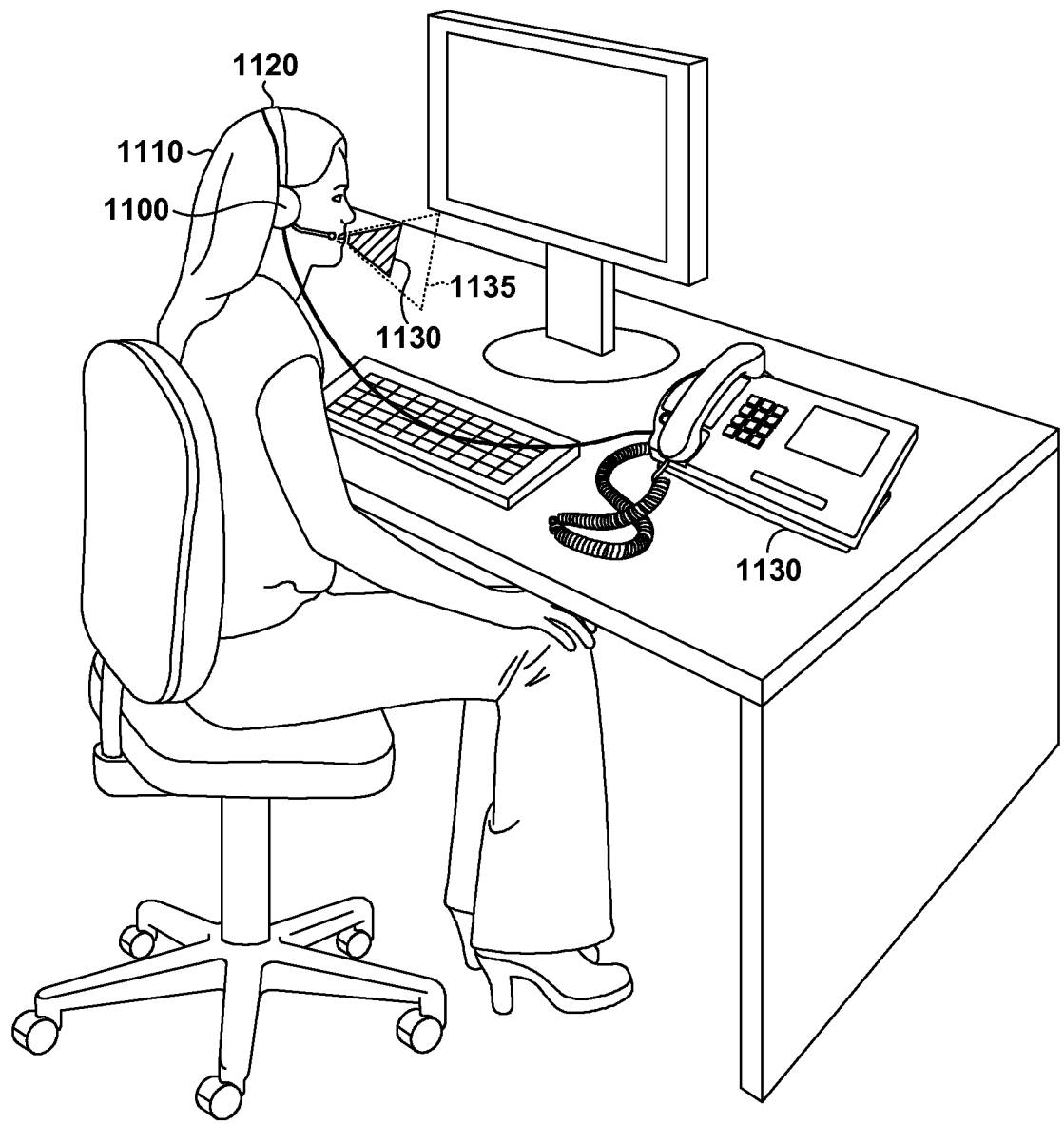
FIG. 11 depicts a user whispering into an auditory communications device including an active resistive touch screen device in accordance with an embodiment of the present invention.
Figure 12:
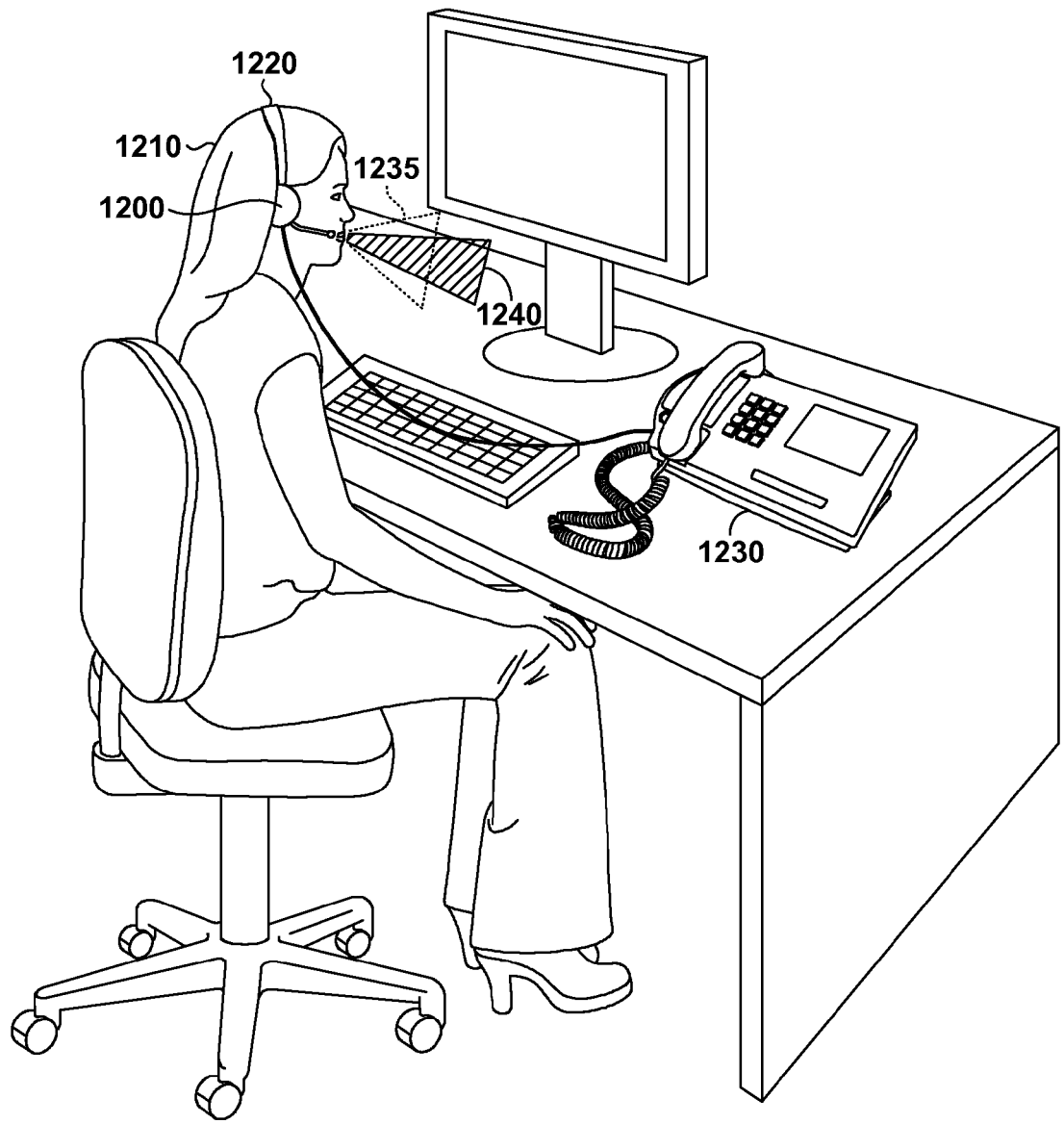
FIG. 12 depicts a user speaking into an auditory communications device including an active resistive touch screen device in accordance with an embodiment of the present invention.

Additional embodiments of the present invention where a determination may be based on a user meeting a minimum contact condition simultaneously with the user meeting a minimum threshold volume are illustrated in FIGS. 11 and 12. In particular, FIGS. 11 and 12 illustrate embodiments of the present invention where an auditory communications device includes an active resistive touch screen device under two conditions: when a user is whispering and when a user is speaking loudly. Similar to FIGS. 9 and 10, in FIGS. 11 and 12, a mute status may not be indicated until it is determined that a user is within contact with a resistive touch screen device, making it "active," and also that it is determined the user is speaking above a minimum threshold volume.

FIG. 11 depicts a user 1120 whispering 1130 into an auditory communications device, such as phone 1110, including an active resistive touch screen device 1100 in accordance with an embodiment of the present invention. As discussed above, an "active" state of resistive touch screen device may require that a user 1120 be in contact with resistive touch screen device 1100. As seen in FIG. 11, the user is whispering 1130 into a headset 1120 of phone 1110. In FIG. 11, headset 1120 is in full contact with the head of user 1120. Accordingly, user 1120 has met a condition of being in contact with resistive touch screen device 1100, thus making it active. However, user 1120 has not met a threshold volume 1135, since whispering 1130 of user 1120 is below threshold volume 1135. Accordingly, in some embodiments where user 1120 is required to meet contact requirements in addition to threshold volume 1135, an indication of a mute status of phone 1100 may not be presented.

In contrast, FIG. 12 depicts a user 1220 speaking 1230 into an auditory communications device, such as phone 1210, including an active resistive touch screen device 1200 in accordance with an embodiment of the present invention. As in FIG. 11, user 1220 is speaking 1230 into headset 1225 of phone 1210. Accordingly, user 1220 has met a condition of being in contact with resistive touch screen device 1200, thus making it active. However, in contrast to FIG. 11, user 1220 has exceeded a threshold volume 1235, since speaking 1230 of user 1220 is above threshold volume 1235. Accordingly, in some embodiments where user 1220 is required to meet contact requirements in addition to threshold volume 1235, an indication of a mute status of phone 1210 may be presented.

Figure 13:
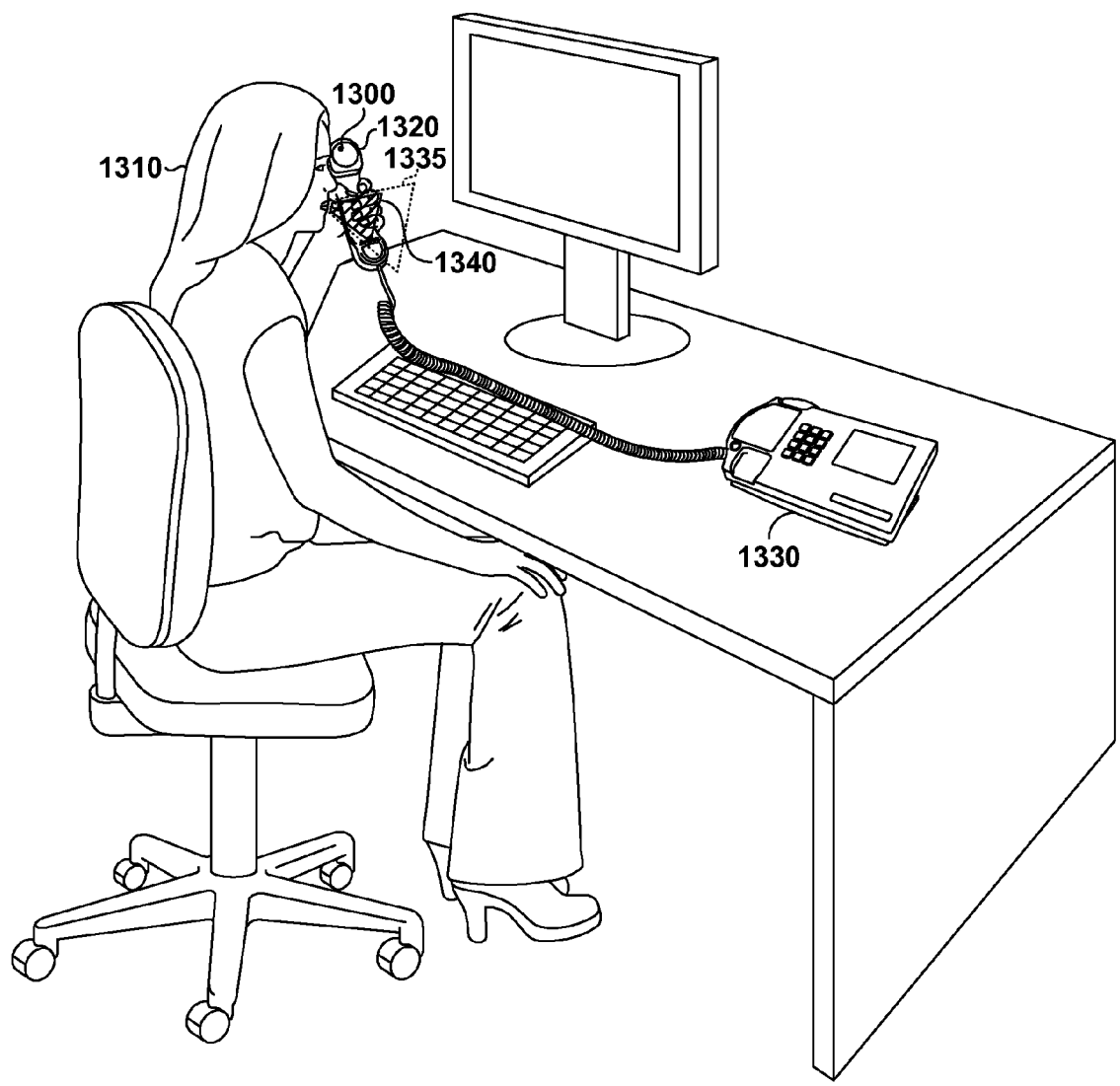
FIG. 13 depicts a user whispering into an auditory communications device including an active capacitive touch screen device in accordance with an embodiment of the present invention.
Figure 14:
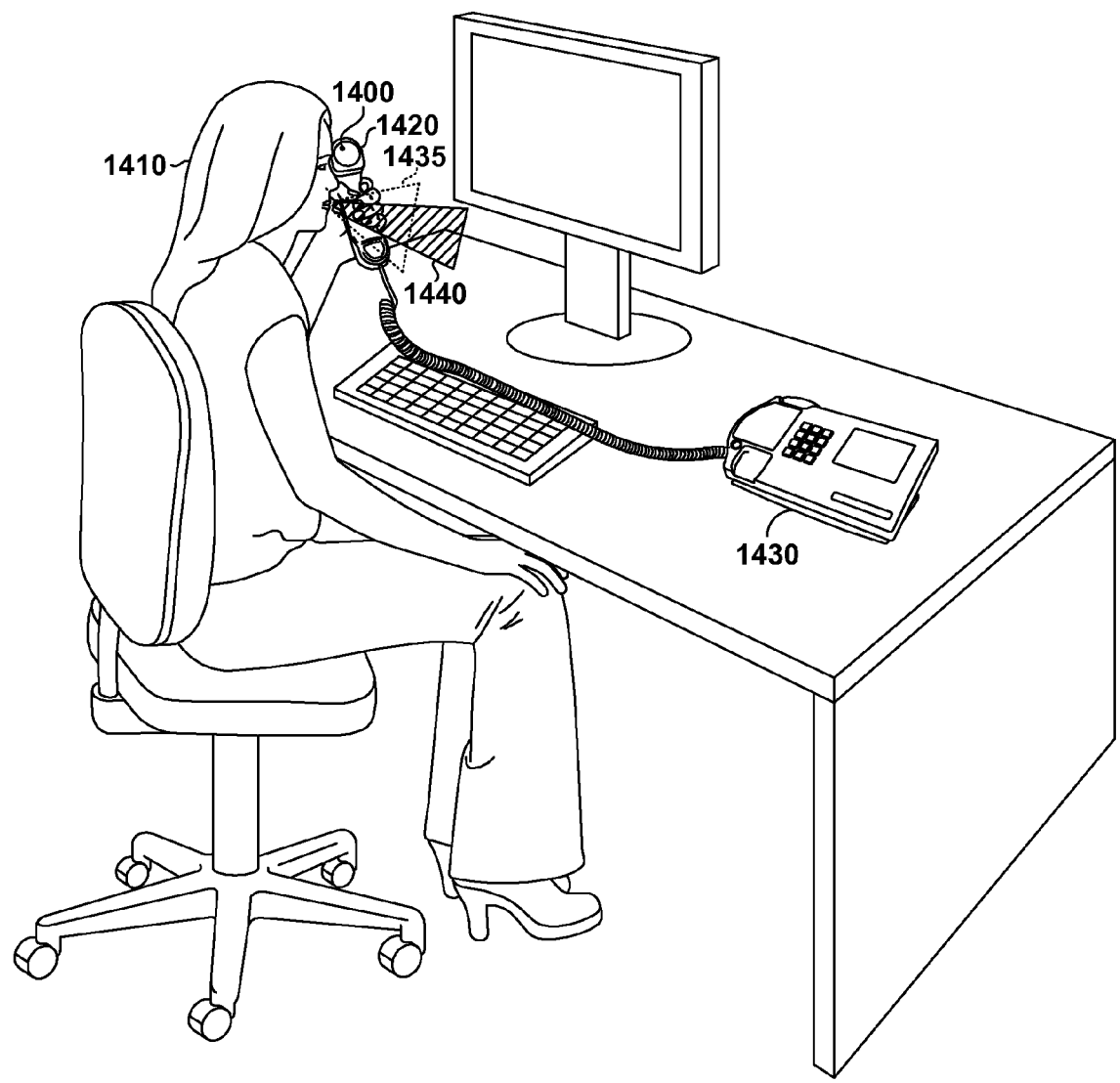
FIG. 14 depicts a user speaking into an auditory communications device including an active capacitive touch screen device in accordance with an embodiment of the present invention.

In further embodiments of the present invention, a determination that a user is attempting to provide input to a phone call may be based on the user meeting a minimum skin-based contact condition simultaneously with the user meeting a minimum threshold volume. FIGS. 13 and 14 illustrate embodiments of the present invention where an auditory communications device includes an active capacitive touch screen device under two conditions: when a user is whispering and when a user is speaking loudly. A mute status may not be indicated until it is determined that a user is within skin-based contact with a capacitive touch screen device, making it "active," and also that it is determined the user is speaking above a minimum threshold volume.

FIG. 13 depicts user 1320 whispering 1330 into an auditory communications device including an active capacitive touch screen device 1300 in accordance with an embodiment of the present invention. As discussed above, an "active" state of capacitive touch screen device may require that user 1320 be in skin-based contact with capacitive touch screen device 1300. As seen in FIG. 13, user 1320 is holding a designated component of phone 1310 with a hand of user 1320. In particular, user 1320 is holding a handset of phone 1310 in his hand. Accordingly, user 1320 has met a condition of being in skin-based contact with capacitive touch screen device 1300. As such, capacitive touch screen device 1300 is active. However, user 1320 has not met a threshold volume 1335, since user 1320 whispering 1330 is below threshold volume 1335. Accordingly, in some embodiments where user 1320 is required to meet skin-based contact requirements in addition to threshold volume 1335, a supplemental indication of a mute status of phone 1310 may not be presented.

In contrast, FIG. 14 depicts user 1420 speaking into an auditory communications device, such as phone 1410, including an active capacitive touch screen device in accordance with an embodiment of the present invention. As in FIG. 13, a hand of user 1420 is in contact with the capacitive touch screen device 1400. Accordingly, user 1420 has met a condition of being in skin-based contact with capacitive touch screen device 1400. However, in contrast to FIG. 13, user 1420 has exceeded a threshold volume 1435, since user 1420 speaking 1430 is above threshold volume 1435. Accordingly, in some embodiments where user 1420 is required to meet skin-based contact requirements in addition to threshold volume 1435, an indication of a mute status of phone 1400 would be presented.

Figure 15:
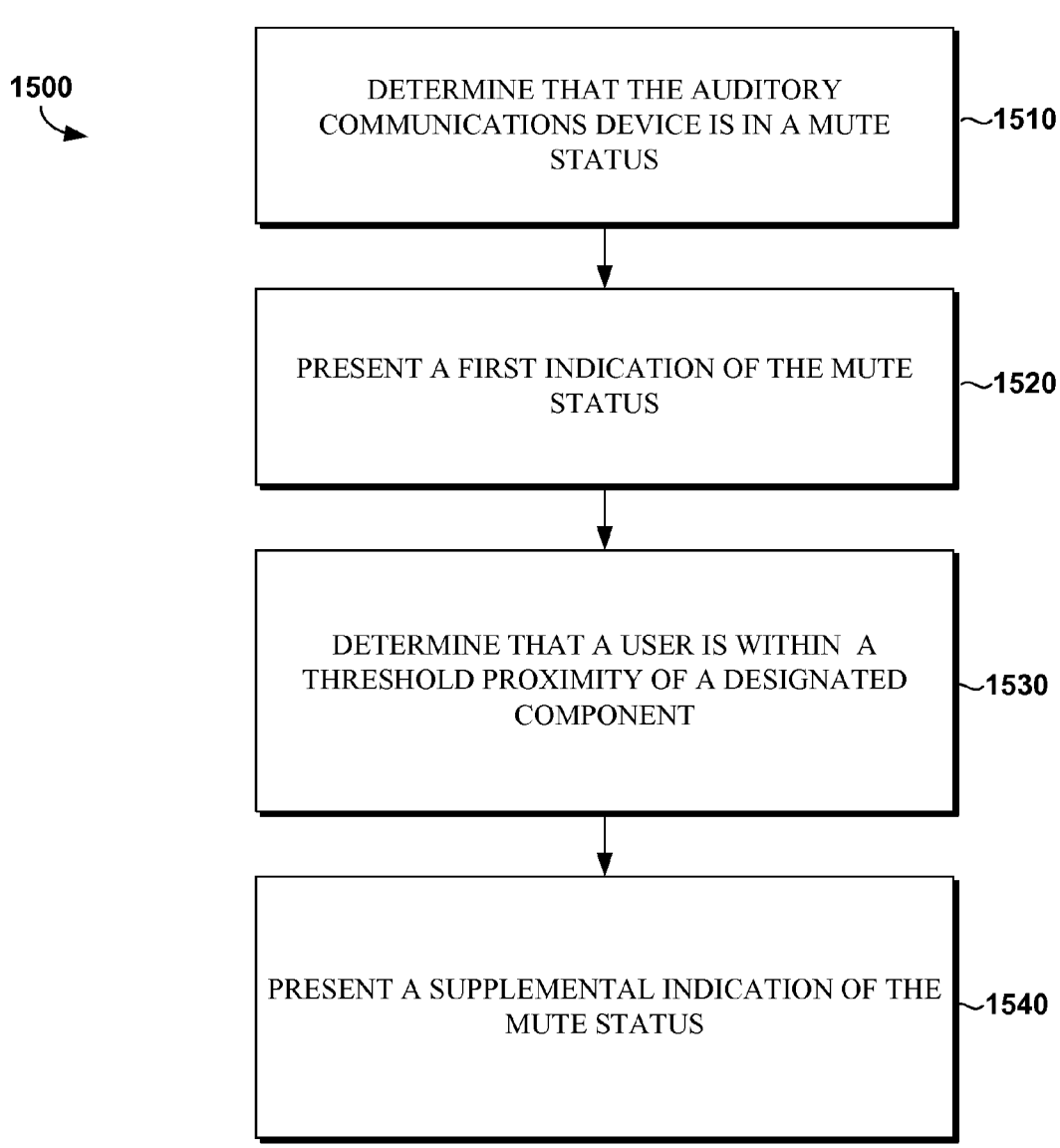
FIG. 15 is a flow diagram showing a method of indicating that a speaker's voice will not be communicated in accordance with an embodiment of the present invention.

FIG. 15 is a flow diagram 1500 showing a method of indicating that a speaker's voice will not be communicated in accordance with an embodiment of the present invention. At step 1510, a determination is made that an auditory communications device is in a mute status. In some embodiments, a mute status prevents a user of the auditory communications device from being heard when attempting to speak through the auditory communications device. At step 1520, a first indication of the mute status is presented in response to the determining that the auditory communications device is in the mute status. In some embodiments, the first indication of the mute status may include a first characteristic. A first characteristic may include a characteristic including at least one of a display notification, a video notification, an audio notification, a notification associated with a first display device, and a notification associated with a second display device. At step 1530, a determination is made that a user is within a threshold proximity of a designated component of the auditory communications device. In some embodiments, a designated component comprises a speaker and/or a microphone.

At step 1540, a supplemental indication of the mute status is presented in response to the determining that the user is within the threshold proximity of the designated component. Determining that a user is within the threshold proximity of the designated component may include determining a distance between the location of the user and the location of the designated component. In some embodiments, a supplemental indication may include a second characteristic. A second characteristic may include at least one of a display notification, a video notification, an audio notification, a notification associated with a first display device, and a notification associated with a second display device. In alternative embodiments, the method also includes monitoring a location of the user. In some embodiments, the location of the user is monitored through the use of a camera. Additionally and/or alternatively, the location of the user may be monitored through the use of a proximity sensor.

Figure 16:
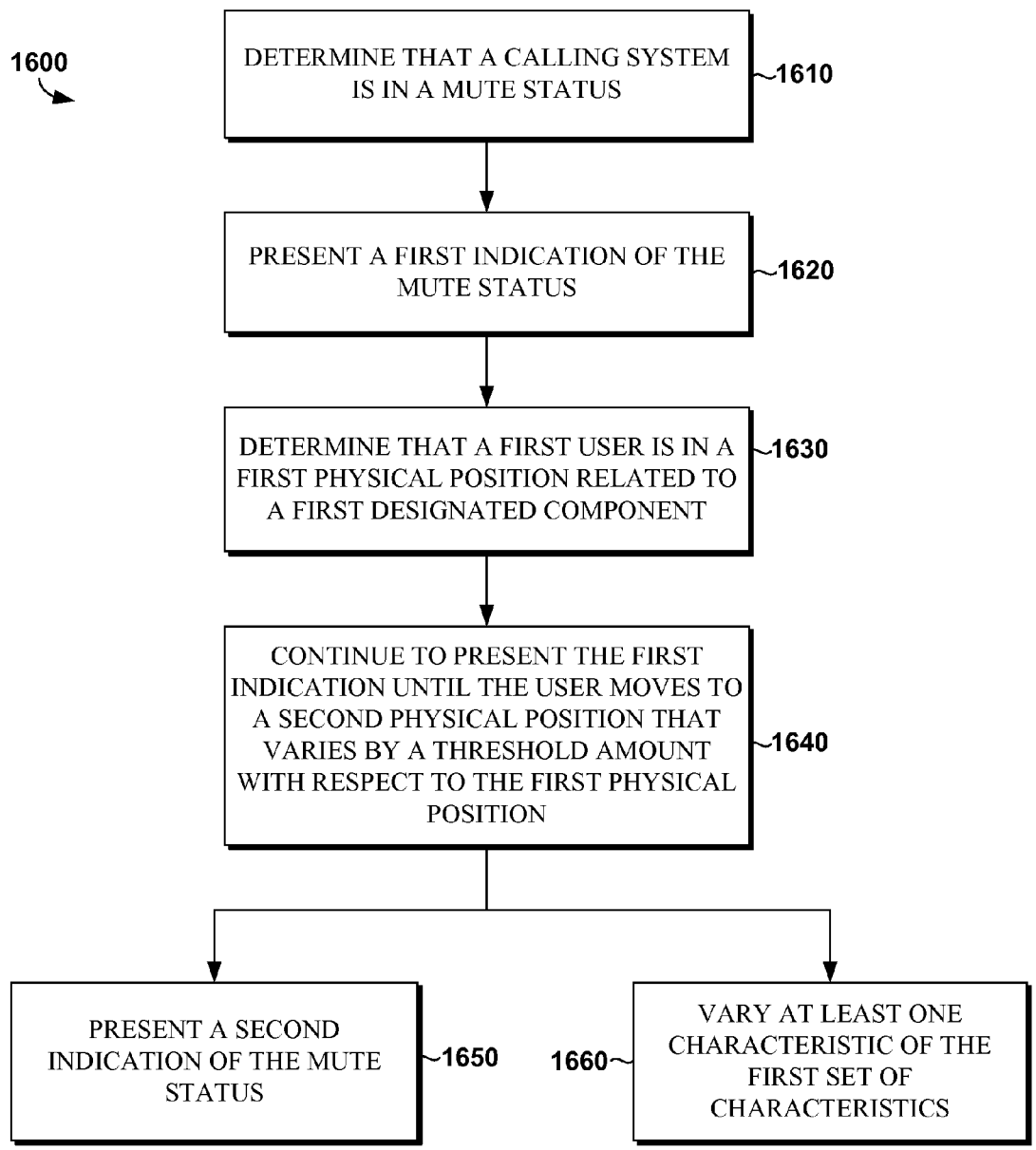
FIG. 16 is another flow diagram showing a method of indicating that a speaker's voice will not be communicated in accordance with an embodiment of the present invention.

FIG. 16 is another flow diagram 1600 showing a method of indicating that a speaker's voice will not be communicated in accordance with an embodiment of the present invention. At step 1610, it is determined that a calling system is in a mute status which prevents a user of the auditory communications device from being heard when attempting to speak through the auditory communications device. At step 1620, a first indication of the mute status is presented in response to the determination that the calling system is in the mute status, wherein the first mute status is characterized by a first set of characteristics. A set of characteristics may include at least two of a volume, a brightness, a display notification, a video notification, an audio notification, a notification associated with a first display device, and a notification associated with a second display device. At step 1630, it is determined that a first user is in a first physical position related to a first designated component of a first communications device that is coupled to the calling system. In some embodiments, a designated component comprises a speaker and/or a microphone.

Further, at step 1640, the first indication is continually presented until the user moves to a second physical position that varies by a threshold amount with respect to the first physical position. In particular, a distance between the first physical position and the second physical position may be determined and, further, the distance between the first physical position and the second physical position may be compared to the threshold amount. In some embodiments, the physical position of the user is monitored through the use of a camera and/or a proximity sensor. Additionally, the user may then do one or more of 1) presenting a second indication of the mute status, wherein the second indication includes a second set of characteristics, as indicated at step 1650; or 2) varying at least one characteristic of the first set of characteristics, as indicated at step 1660. The method may further include monitoring a physical position of the first user. Additionally and/or alternatively, the method may include determining a physical position of the first designated component of the communications device.

Figure 17:
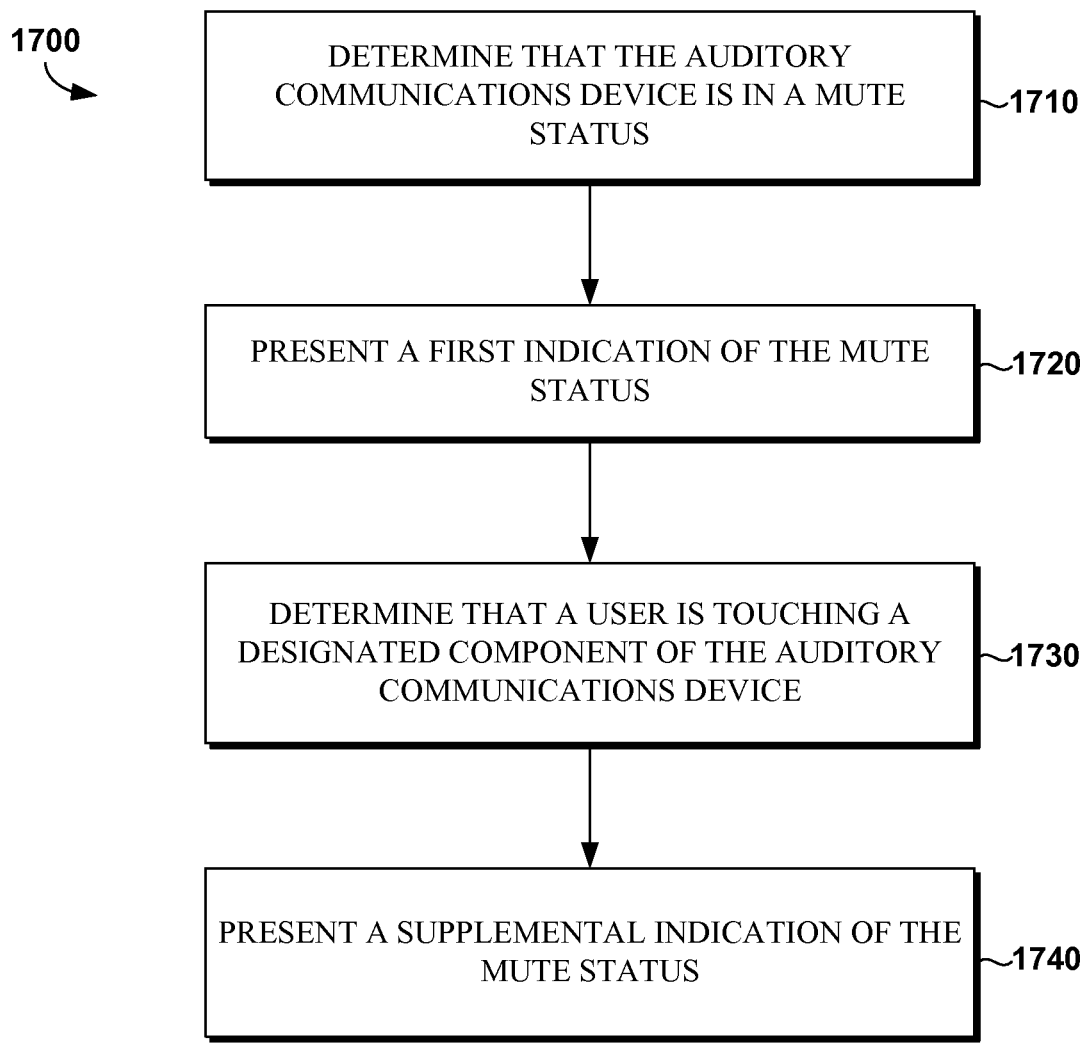
FIG. 17 is a further flow diagram showing a method of indicating that a speaker's voice will not be communicated in accordance with an embodiment of the present invention.

FIG. 17 is a further flow diagram 1700 showing a method of indicating that a speaker's voice will not be communicated in accordance with an embodiment of the present invention. At step 1710, an auditory communications device is determined to be in a mute status. A mute status prevents a user of the auditory communications device from being heard when attempting to speak through the auditory communications device. At step 1720, a first indication of the mute status is presented in response to the determining that the auditory communications device is in the mute status. The first indication of the mute status may be presented to a user. Alternatively, the first indication of the mute status may be presented at a device independent of whether a user is present. The first indication of said mute status may include a first characteristic, wherein a characteristic comprises at least one of a display notification, a video notification, an audio notification, a notification associated with a first display device, and a notification associated with a second display device. At step 1730, a determination is made that a user is touching a designated component of the auditory communications device. The determination that a user is touching a designated component may include receiving an input from the user at a touchsensitive device. In some embodiments, a touch-screen device may comprise a resistive touch screen device and/or a capacitive touch screen device. In further embodiments, the physical position of the user is monitored through the use of a camera and/or a proximity sensor. At step 1740, a supplemental indication of the mute status is presented in response to the determining that the user is touching the designated component. The supplemental indication of said mute status may include a second characteristic, wherein a characteristic comprises at least one of a display notification, a video notification, an audio notification, a notification associated with a first display device, and a notification associated with a second display device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, cause an auditory communications device to perform a method of indicating that a speaker's voice will not be communicated, the method comprising:
   determining that the auditory communications device is in a mute status, which prevents a user of the auditory communications device from being heard when attempting to speak through the auditory communications device;
   presenting a first indication of the mute status in response to the determining that the auditory communications device is in the mute status;
   determining that the user is attempting to provide input to the auditory communications device by determining that the user is within a first threshold proximity of a designated component of the auditory communications device;
   presenting a second indication of the mute status in response to the determining that the user is attempting to provide input to the auditory communications device by determining that the user is within the first threshold proximity of the designated component of the auditory communications device;
   determining that the user meets a threshold volume of voice input and is within a second threshold proximity that is less than the first threshold proximity of the designated component of the auditory communications device; and
   presenting a third indication of the mute status in response to the determining that the user meets the threshold volume of voice input and is within the second threshold proximity of the designated component.

2. The computer-readable media of claim 1, wherein the designated component comprises at least one of a speaker and a microphone.

3. The computer-readable media of claim 1, wherein the first indication of the mute status comprises a first characteristic, wherein the first characteristic comprises at least one of a display notification, a video notification, an audio notification, a notification associated with a first display device, and a notification associated with a second display device.

4. The computer-readable media of claim 3, wherein the second indication of the mute status comprises a second characteristic, wherein the second characteristic comprises at least one of a display notification, a video notification, an audio notification, a notification associated with a first display device, and a notification associated with a second display device, and wherein the third indication of the mute status comprises a third characteristic, wherein the third characteristic comprises at least one of a display notification, a video notification, an audio notification, a notification associated with a first display device, and a notification associated with a second display device, wherein the third indication is amplified and more intrusive than the second indication.

5. The computer-readable media of claim 1, wherein determining that a user is within the first and second threshold proximity of the designated component comprises:
   determining a distance between the location of the user and a location of the designated component; and
   comparing the distance between the location of the user and the location of the designated component to the first or second threshold proximity of the designated component.

6. The computer-readable media of claim 1, further comprising:
   monitoring a location of the user.

7. The computer-readable media of claim 6, wherein the location of the user is monitored through the use of at least one of a camera and a proximity sensor.

8. One or more non-transitory computer-readable media having computer-executable instructions embodied thereon that, when executed, cause an auditory communications device to perform a method of indicating that a speaker's voice will not be communicated, the method comprising:
   determining that the auditory communications device is in a mute status, which prevents a user of the auditory communications device from being heard when attempting to speak through the auditory communications device;
   presenting a first indication of the mute status in response to the determining that the auditory communications device is in the mute status;
   determining that the user is attempting to provide input to the auditory communications device by determining that the user is within a first threshold proximity of a designated component of the auditory communications device;
   presenting a second indication of the mute status in response to the determining that the user is attempting to provide input to the auditory communications device by determining that the user is within the first threshold proximity of the designated component of the auditory communications device;
   determining that a user is within a second threshold proximity that is less than the first threshold proximity of a designated component of the auditory communications device; and
   presenting a third indication of the mute status in response to the determining that the user is within the second threshold proximity of the designated component, the third indication being different from the first indication and the second indication.

9. The computer-readable media of claim 8, wherein the designated component comprises at least one of a speaker and a microphone.

10. The computer-readable media of claim 8, wherein the first indication of the mute status comprises a first characteristic, wherein the first characteristic comprises at least one of a display notification, a video notification, an audio notification, a notification associated with a first display device, and a notification associated with a second display device.

11. The computer-readable media of claim 10, wherein the indication of the mute status comprises a second characteristic, wherein the second characteristic comprises at least one of a display notification, a video notification, an audio notification, a notification associated with a first display device, and a notification associated with a second display device, and wherein the third indication of the mute status comprises a third characteristic, wherein the third characteristic comprises at least one of a display notification, a video notification, an audio notification, a notification associated with a first display device, and a notification associated with a second display device, wherein the third indication is amplified and more intrusive than the second indication.

12. The computer-readable media of claim 8, wherein determining that a user is within the first and second threshold proximity of the designated component comprises:
 determining a distance between the location of the user and a location of the designated component; and
 comparing the distance between the location of the user and the location of the designated component to the first or second threshold proximity of the designated component.

13. The computer-readable media of claim 8, further comprising:
 monitoring a location of the user.

14. The computer-readable media of claim 13, wherein the location of the user is monitored through the use of at least one of a camera and a proximity sensor.

15. One or more non-transitory computer-readable media having computer-executable instructions embodied thereon that, when executed, cause an auditory communications device to perform a method of indicating that a speaker's voice will not be communicated, the method comprising:
 determining that the auditory communications device is in a mute status, which prevents a user of the auditory communications device from being heard when attempting to speak through the auditory communications device;
 presenting a first indication of the mute status in response to the determining that the auditory communications device is in the mute status;
 determining that the user is attempting to provide input to the auditory communications device by determining that the user is within a first threshold proximity of a designated component of the auditory communications device;
 presenting a second indication of the mute status in response to the determining that the user is attempting to provide input to the auditory communications device by determining that the user is within the first threshold proximity of the designated component of the auditory communications device, the second indication being different from the first indication;
 determining that the user meets a threshold volume of voice input and is within a second threshold proximity that is less than the first threshold proximity of the designated component of the auditory communications device; and
 presenting a third indication of the mute status in response to the determining that the user meets the threshold volume of voice input and is within the second threshold proximity of the designated component, the third indication being different from the first indication and the second indication.

16. The computer-readable media of claim 15, wherein the designated component comprises at least one of a speaker and a microphone.

17. The computer-readable media of claim 15, wherein the first indication of the mute status comprises a first characteristic, wherein the characteristic comprises at least one of a display notification, a video notification, an audio notification, a notification associated with a first display device, and a notification associated with a second display device.

18. The computer-readable media of claim 17, wherein the indication of the mute status comprises a second characteristic, wherein the second characteristic comprises at least one of a display notification, a video notification, an audio notification, a notification associated with a first display device, and a notification associated with a second display device; and wherein the third indication of said mute status comprises a third characteristic, wherein the third characteristic comprises at least one of a display notification, a video notification, and audio notification, a notification associated with a first display device, and a notification associated with a second display device, wherein the third indication is amplified and more intrusive than the second indication.

19. The computer-readable media of claim 15, wherein determining that the user is within the first and second threshold proximity of the designated component comprises:
 determining a distance between the location of the user and a location of the designated component; and
 comparing the distance between the location of the user and the location of the designated component to the first or second threshold proximity of the designated component.

20. The computer-readable media of claim 15, further comprising monitoring a location of the user, wherein the location of the user is monitored through the use of at least one of a camera and a proximity sensor.

* * * * *